United States Patent
Yi et al.

(10) Patent No.: US 10,374,817 B2
(45) Date of Patent: Aug. 6, 2019

(54) METHOD FOR HANDLING OF UNKNOWN LCID VALUES IN A MULTICAST CHANNEL IN A WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/562,097

(22) PCT Filed: Mar. 15, 2016

(86) PCT No.: PCT/KR2016/002568
§ 371 (c)(1),
(2) Date: Sep. 27, 2017

(87) PCT Pub. No.: WO2016/163655
PCT Pub. Date: Oct. 13, 2016

(65) Prior Publication Data
US 2018/0076969 A1 Mar. 15, 2018

Related U.S. Application Data

(60) Provisional application No. 62/143,809, filed on Apr. 7, 2015.

(51) Int. Cl.
*H04L 12/18* (2006.01)
*H04W 72/00* (2009.01)
(Continued)

(52) U.S. Cl.
CPC ........ *H04L 12/1859* (2013.01); *H04L 12/189* (2013.01); *H04W 56/001* (2013.01);
(Continued)

(58) Field of Classification Search
CPC .. H04L 12/1859; H04L 12/189; H04W 76/40; H04W 56/001; H04W 72/005; H04W 80/02; H04W 88/08; H04W 4/06
(Continued)

(56) References Cited

U.S. PATENT DOCUMENTS

| 2008/0186946 | A1* | 8/2008 | Marinier | H04L 49/90 |
| | | | | 370/349 |
| 2011/0105107 | A1* | 5/2011 | Kwon | H04W 28/06 |
| | | | | 455/422.1 |

(Continued)

FOREIGN PATENT DOCUMENTS

WO 2016010258 A1 1/2016

OTHER PUBLICATIONS

Motorola: "Addition of new MAC test case for CCCH mapped to UL SCH/ DL-SCH / Invalid LCID (Logical Channel ID)", R5-083223, 3GPP TSG RAN WG5 Meeting #40, Jeju Island, S. Korea, Aug. 18-22, 2008, pp. 2-3.

(Continued)

*Primary Examiner* — Edward F Urban
*Assistant Examiner* — Ralph H Justus
(74) *Attorney, Agent, or Firm* — Dentons US LLP

(57) ABSTRACT

The present invention relates to a wireless communication system. More specifically, the present invention relates to a method and a device for handling of unknown LCID values in a Multicast Channel in a wireless communication system, the method comprising: receiving a MAC PDU including at least one LCID on MCH; discarding a header field containing a first LCID and a corresponding MAC SDU indicated by the header field in the received MAC PDU if the UE does not join an MBMS service transmitted on a MTCH identified by the first LCID currently; and processing remaining parts of the MAC PDU after the header field and the (Continued)

corresponding MAC SDU are discarded from the MAC PDU.

12 Claims, 12 Drawing Sheets

(51) Int. Cl.
      *H04W 80/02*    (2009.01)
      *H04W 88/08*    (2009.01)
      *H04W 76/40*    (2018.01)
      *H04W 56/00*    (2009.01)
      *H04W 4/06*    (2009.01)

(52) U.S. Cl.
      CPC ......... *H04W 72/005* (2013.01); *H04W 76/40* (2018.02); *H04W 80/02* (2013.01); *H04W 88/08* (2013.01); *H04W 4/06* (2013.01)

(58) Field of Classification Search
      USPC ........................................................ 455/3.04
      See application file for complete search history.

(56) References Cited

U.S. PATENT DOCUMENTS

| | | | |
|---|---|---|---|
| 2011/0176471 A1* | 7/2011 | Tseng | H04W 76/40 370/312 |
| 2011/0299492 A1* | 12/2011 | Lee | H04W 4/00 370/329 |
| 2012/0275399 A1 | 11/2012 | Liu et al. | |
| 2013/0114492 A1 | 5/2013 | Liu et al. | |
| 2013/0242871 A1 | 9/2013 | Marinier et al. | |
| 2015/0163695 A1* | 6/2015 | Li | H04W 12/06 370/328 |
| 2016/0345198 A1* | 11/2016 | Lee | H04L 69/28 |

OTHER PUBLICATIONS

XP050952524: R2-150509, 3GPP TSG-RAN WG2 Meeting #89, Athens, Greece, Feb. 9-13, 2015, Nokia Networks, Nokia Corporation, "Mac PDU containing reserved values," pp. 1-2.
XP050928110: 3GPP TS 36.321 vol. RAN WG2, No. v12.5.0 (Mar. 25, 2015), 3rd Generation Partnership Project; Technical Specification Group Radio Access Network; Evolved Universal Terrestrial Radio Access (E-UTRA); Medium Access Control (MAC) Protocol specification, (Release 12) pp. 1-77.

* cited by examiner (a) Control-Plane Protocol Stack (b) User-Plane Protocol Stack

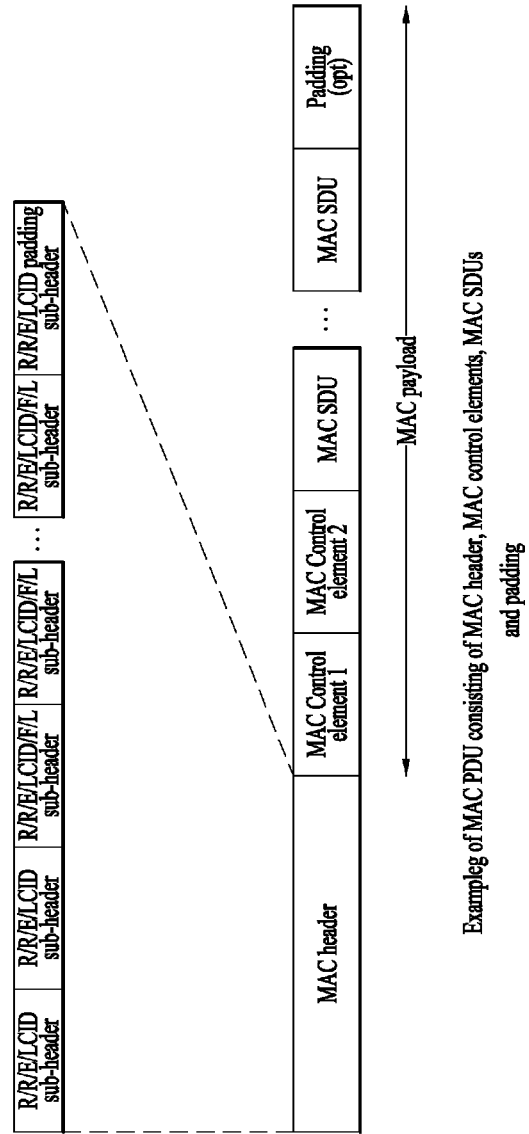

R/R/E/LCID sub-header

FIG. 9B

| LCID 1 | Stop MTCH 1 | Oct 1 |
|---|---|---|
| Stop MTCH 1 | | Oct 2 |
| LCID 2 | Stop MTCH 2 | Oct 3 |
| Stop MTCH 2 | | Oct 4 |

. . .

| LCID n | Stop MTCH n | Oct 2n-1 |
|---|---|---|
| Stop MTCH n | | Oct 2n |
| LCID x | S x | Oct 2n+1 |

. . .

| LCID x+y | S x+y | Oct 2n+1+y |
|---|---|---|

METHOD FOR HANDLING OF UNKNOWN LCID VALUES IN A MULTICAST CHANNEL IN A WIRELESS COMMUNICATION SYSTEM AND A DEVICE THEREFOR

This application claims the benefit of 35 U.S.C. § 371 National Stage Entry of International Application No. PCT/KR2016/002568 filed on Mar. 15, 2016 and claims the benefit of U.S. Provisional Application No. 62/143,809 filed on Apr. 7, 2015, all of which are incorporated by reference in their entirety herein.

TECHNICAL FIELD

The present invention relates to a wireless communication system and, more particularly, to a method for handling of unknown LCID values in a Multicast Channel in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for handling of unknown LCID values in a Multicast Channel in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to the present invention, the UE can ignore only fields containing unknown values and corresponding parts of a MAC PDU if the MAC PDU is received on MCH.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIGS. 8A to 8C are conceptual diagrams illustrating for a MAC PDU structure;

FIG. 9B is Extended MCH Scheduling Information MAC control element.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
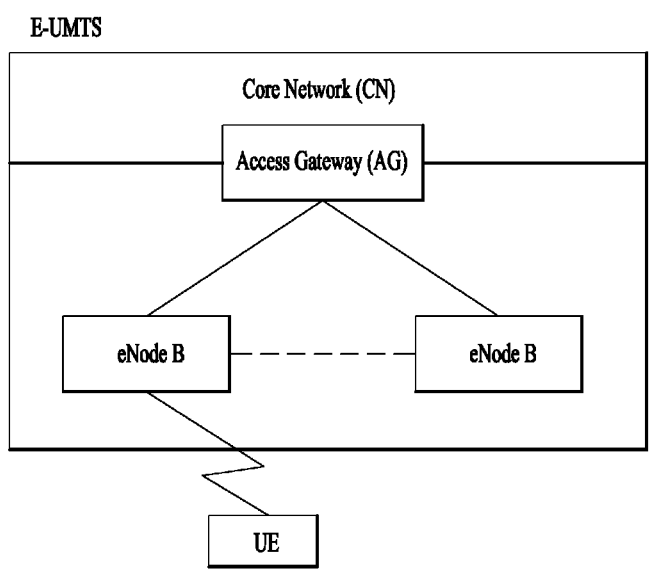
FIG. 1 is a diagram showing a network structure of an Evolved Universal Mobile Telecommunications System (E-UMTS) as an example of a wireless communication system.
Figure 2A:
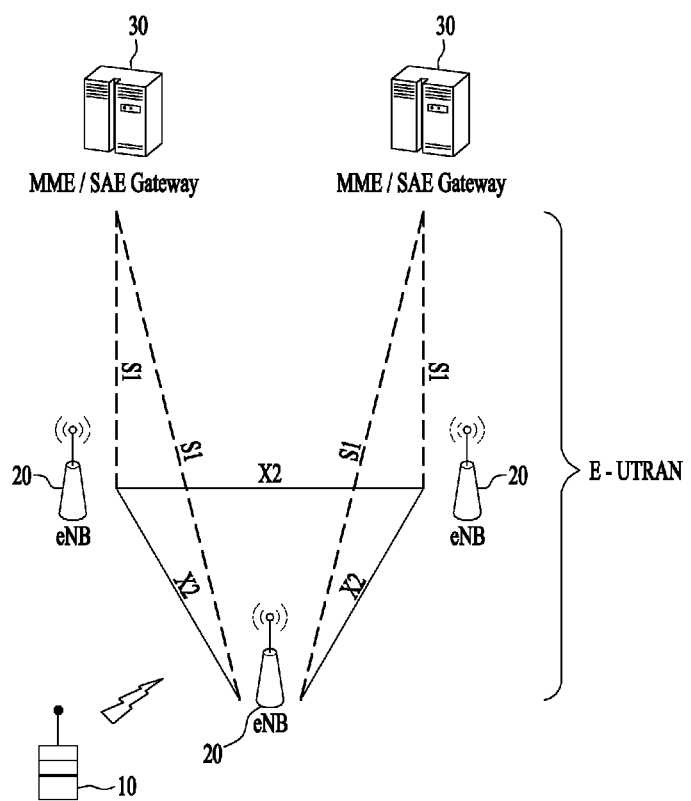
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
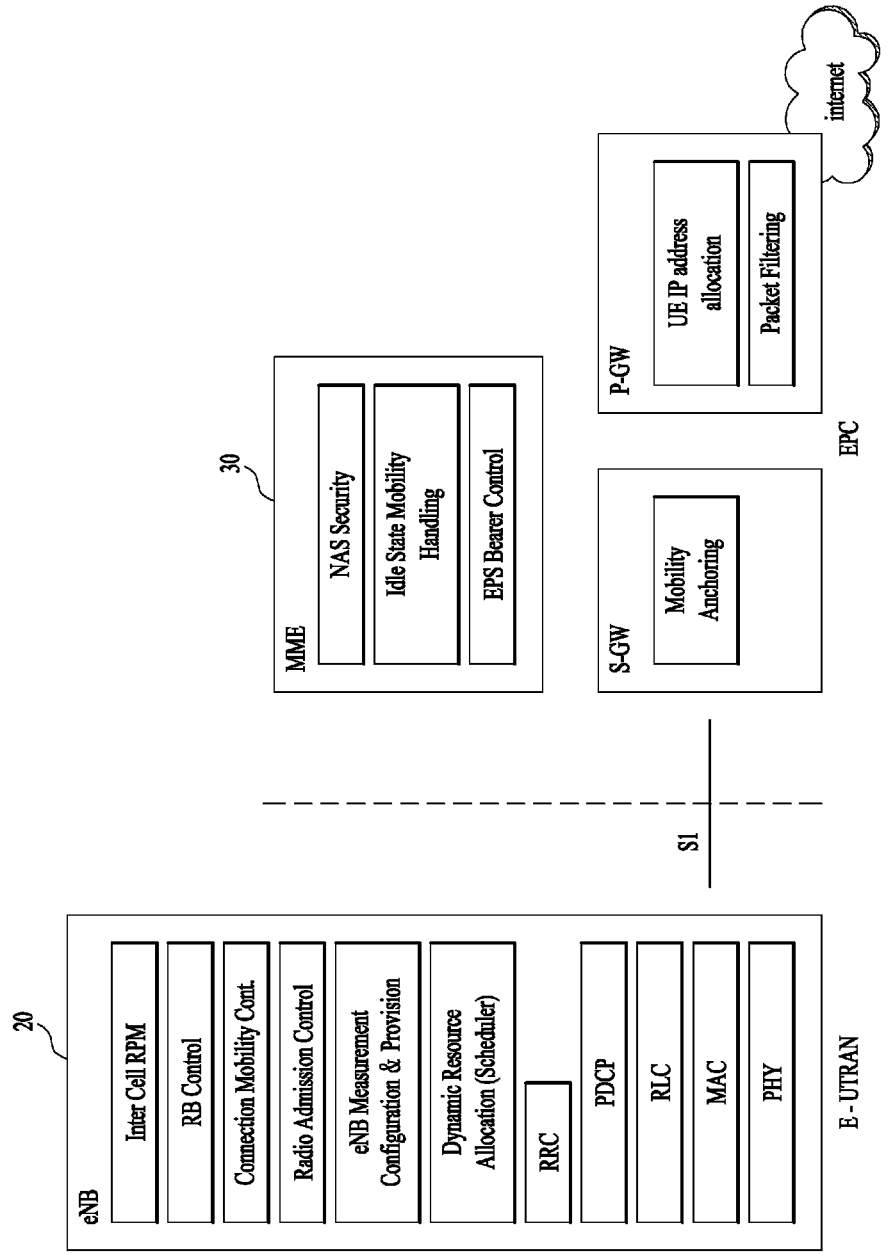
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
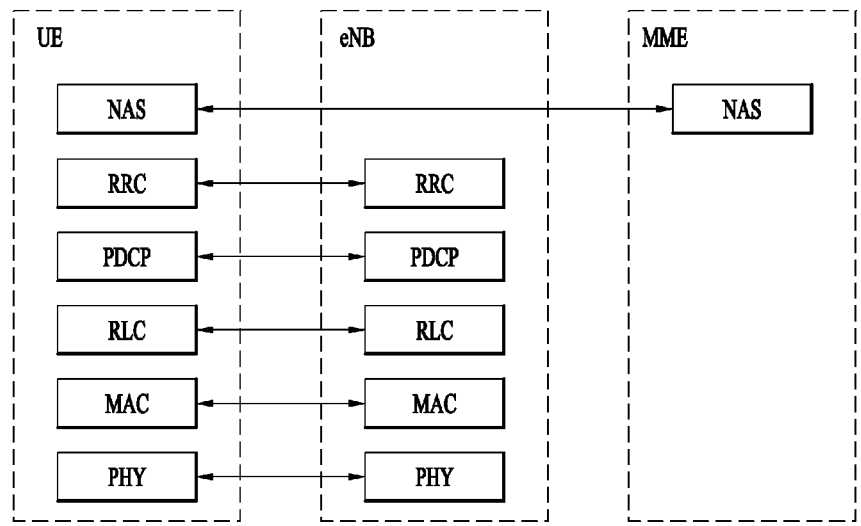
FIG. 3 is a diagram showing a control plane and a user plane of a radio interface protocol between a UE and an E-UTRAN based on a 3rd generation partnership project (3GPP) radio access network standard.
Figure 3:
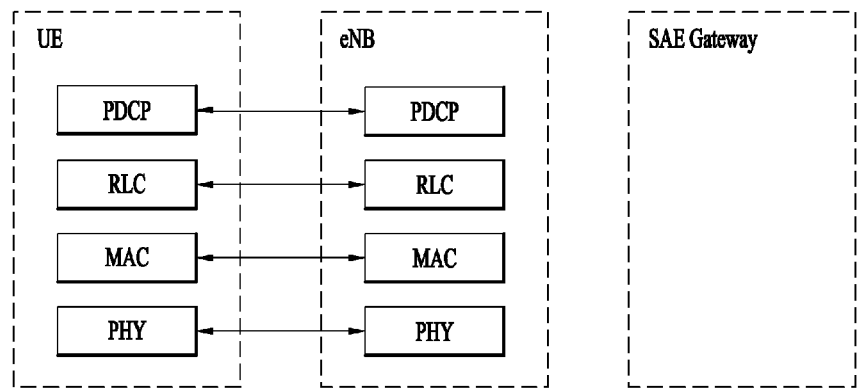

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
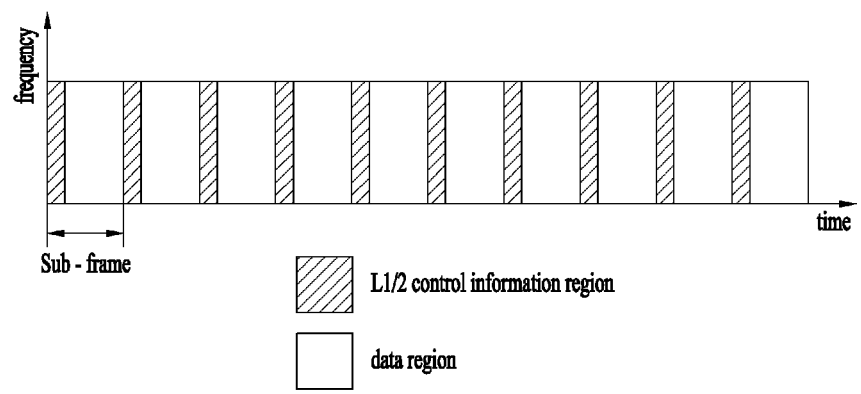
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
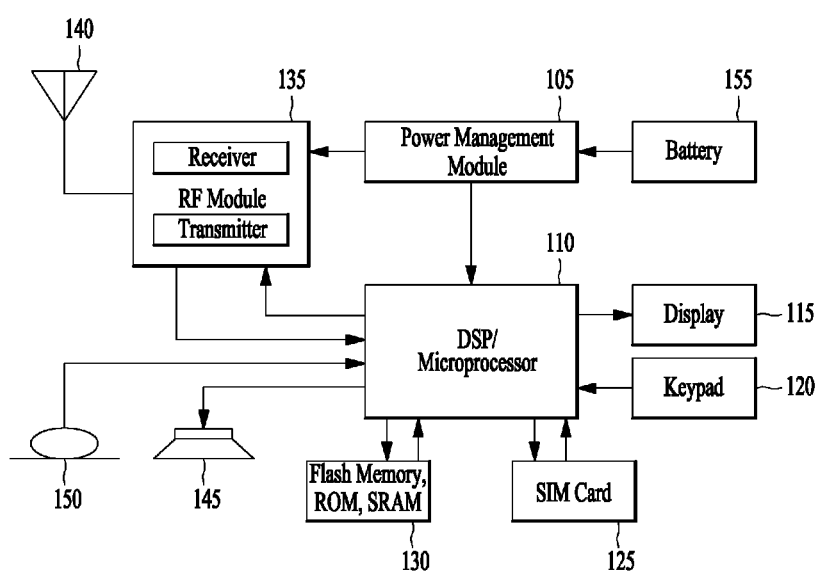
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
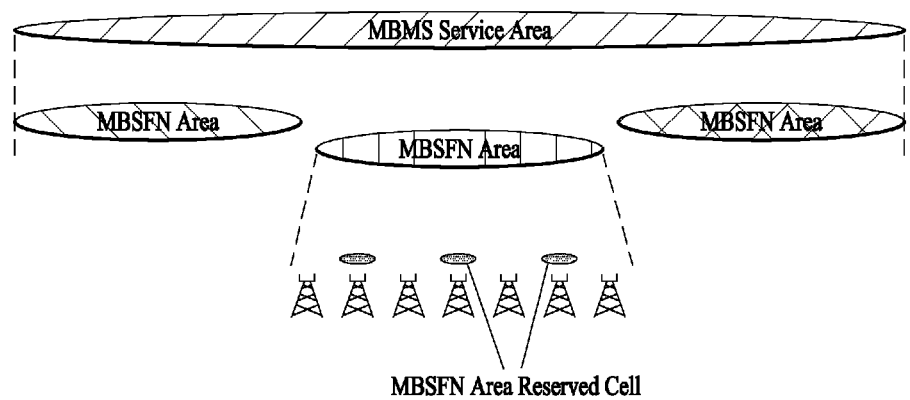
FIG. 6 is a diagram for MBMS definition.

FIG. 6 is a diagram for MBMS definition.

In the past, cellular systems have mostly focused on transmission of data intended for a single user and not on multicast/broadcast services. Broadcast networks, exemplified by the radio and TV broadcasting networks, have on the other hand focused on covering very large areas with the same content and have offered no or limited possibilities for transmission of data intended for a single user. Multimedia Broadcast Multicast Services (MBMS) support multicast/broadcast services in a cellular system, thereby combining the provision of multicast/broadcast and unicast services within a single network.

With MBMS, the same content is transmitted to multiple users located in a specific area, known as the MBMS service area and typically comprising multiple cells. In each cell participating in the transmission, a point-to-multipoint radio resource is configured and all users subscribing to the MBMS service simultaneously receive the same transmitted signal. No tracking of users' movement in the radio-access network is performed and users can receive the content without notifying the network.

When providing multicast/broadcast services for mobile devices, there are several aspects to take into account good coverage and low terminal power consumption.

The coverage, or more accurately the data rate possible to provide, is basically determined by the link quality of the worst-case user, as no user-specific adaptation of transmission parameters can be used in a multicast/broadcast system providing the same information to multiple users. OFDM transmission provides specific benefits for provision of multi-cell multicast/broadcast services. If the transmissions from the different cells are time synchronized, the resulting signal will, from a terminal point of view, appear as a transmission from a single point over a time-dispersive channel. For LTE this kind of transmission is referred to as an MBMS Single-Frequency Network (MBSFN).

MBSFN transmission provides several benefits. Above all, increased received signal strength, especially at the border between cells involved in the MBSFN transmission, as the terminal can utilize the signal energy received from multiple cells. And reduced interference level, once again especially at the border between cells involved in the MBSFN transmission, as the signals received from neighboring cells will not appear as interference but as useful signals. Lastly, additional diversity against fading on the radio channel as the information is received from several, geographically separated locations, typically making the overall aggregated channel appear highly time-dispersive or, equivalently, highly frequency selective.

Altogether, this allows for significant improvements in the multicast/broadcast reception quality, especially at the border between cells involved in the MBSFN transmission, and, as a consequence, significant improvements in the achievable multicast/broadcast data rates.

Providing for power-efficient reception in the terminal in essence implies that the structure of the overall transmission should be such that data for a service-of-interest is provided in short high-data-rate bursts rather than longer low-data-rate bursts. This allows the terminal to occasionally wake up to receive data with long periods of DRX in between. In LTE, this is catered for by time-multiplexing unicast and broadcast transmissions, as well as by the scheduling of different MBMS services.

Figure 7:
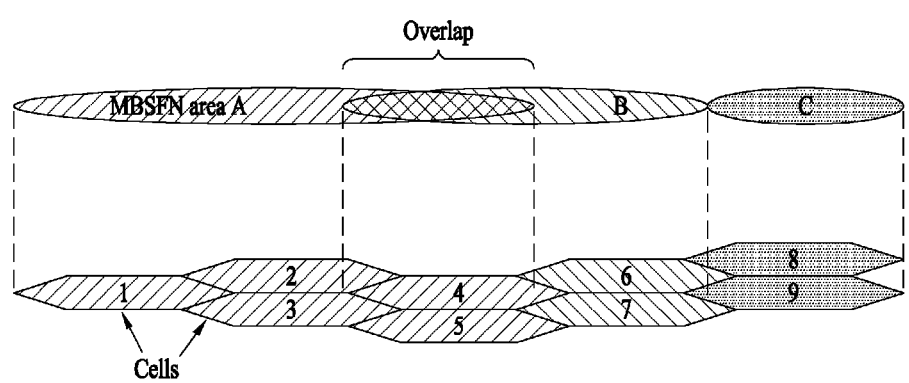
FIG. 7 is a diagram for an example of MBSFN area.

FIG. 7 is a diagram for an example of MBSFN area.

An MBSFN area is a specific area where one or several cells transmit the same content. For example, in FIG. 7, cells 8 and 9 both belong to MBSFN area C. Not only can an MBSFN area consist of multiple cells, a single cell can also be part of multiple, up to eight, MBSFN areas, as shown in FIG. 7, where cells 4 and 5 are part of both MBSFN areas A and B. Note that, from an MBSFN reception point of view, the individual cells are invisible, although the terminal needs to be aware of the different cells for other purposes, such as reading system information and notification indicators, as discussed below. The MBSFN areas are static and do not vary over time.

The usage of MBSFN transmission obviously requires not only time synchronization among the cells participating in an MBSFN area, but also usage of the same set of radio resources in each of the cells for a particular service. This coordination is the responsibility of the Multi-cell/multicast Coordination Entity (MCE), which is a logical node in the radio-access network handling allocation of radio resources and transmission parameters (time-frequency resources and transport format) across the cells in the MBSFN area.

The MBSFN Area consists of a group of cells within an MBSFN Synchronization Area of a network, which are coordinated to achieve an MBSFN Transmission. Except for the MBSFN area Reserved Cells, all cells within an MBSFN Area contribute to the MBSFN Transmission and advertise its availability. The UE may only need to consider a subset of the MBSFN areas that are configured, i.e. when it knows which MBSFN area applies for the service(s) it is interested to receive.

MBSFN Synchronization Area is an area of the network where all eNodeBs can be synchronized and perform MBSFN transmissions. MBSFN Synchronization Areas are capable of supporting one or more MBSFN Areas. On a given frequency layer, a eNodeB can only belong to one MBSFN Synchronization Area. MBSFN Synchronization Areas are independent from the definition of MBMS Service Areas. MBSFN Transmission or a transmission in MBSFN mode is a simulcast transmission technique realized by transmission of identical waveforms at the same time from multiple cells. An MBSFN Transmission from multiple cells within the MBSFN Area is seen as a single transmission by a UE.

MBSFN Area Reserved Cell is a cell within a MBSFN Area which does not contribute to the MBSFN Transmission. The cell may be allowed to transmit for other services but at restricted power on the resource allocated for the MBSFN transmission, and Synchronization Period is the synchronization period provides the time reference for the indication of the start time of each synchronization sequence. The time stamp which is provided in each SYNC PDU is a relative value which refers to the start time of the synchronization period. The duration of the synchronization period is configurable.

MBSFN is supported for the MCH transport channel. Multiplexing of transport channels using MBSFN and non-MBSFN transmission is done on a per-sub-frame basis. Additional reference symbols, transmitted using MBSFN are transmitted within MBSFN subframes.

MCH transmission may occur in subframes configured by upper layer for MCCH or MTCH transmission. For each such subframe, upper layer indicates if signallingMCS or dataMCS applies. The transmission of an MCH occurs in a set of subframes defined by PMCH-Config. An MCH Scheduling Information MAC control element is included in the first subframe allocated to the MCH within the MCH scheduling period to indicate the position of each MTCH and unused subframes on the MCH.

If pmch-InfoListExt is configured for an MCH, an Extended MCH Scheduling Information MAC control element is included in the first subframe allocated to the corresponding MCH within the MCH scheduling period to indicate the position of each MTCH and unused subframes on the MCH, and to indicate whether MTCH transmission is to be suspended. The MAC entity shall assume that the first scheduled MTCH starts immediately after the MCCH or the MCH Scheduling Information MAC control element or the Extended MCH Scheduling Information MAC control element if the MCCH is not present, and the other scheduled MTCH(s) start immediately after the previous MTCH, at the earliest in the subframe where the previous MTCH stops.

When the MAC entity needs to receive MCH, the MAC entity may attempt to decode the TB on the MCH. If a TB on the MCH has been successfully decoded, the MAC entity may demultiplex the MAC PDU and deliver the MAC SDU(s) to upper layers.

When the MAC entity receives the Extended MCH Scheduling Information MAC control element, the MAC entity may indicate the MTCH(s) to be suspended to the upper layers.

Figure 8B:
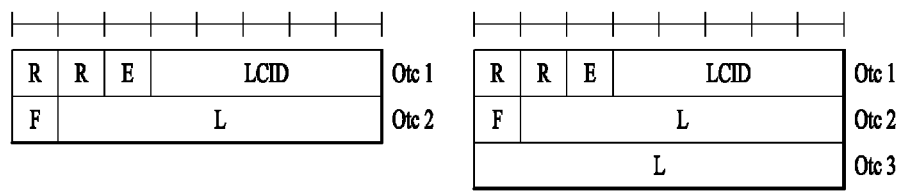
Figure 8C:
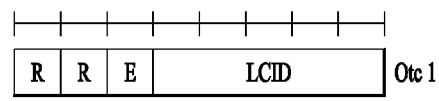

FIGS. 8A to 8B are conceptual diagrams illustrating for a MAC PDU structure.

FIG. 8A is a diagram for MAC PDU consisting of MAC header, MAC control elements, MAC SDUs and padding.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC header, shown in FIG. 8A, is used.

To each RLC PDU, there is an associated subheader in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to a physical layer.

In addition to multiplexing of different logical channels, the MAC layer can also insert the so-called MAC control elements into the transport blocks to be transmitted over the transport channels. A MAC control element is used for in-band control signaling, for example, timing-advance commands and random access response. Control elements are identified with reserved values in the LCID field, where the LCID value indicates the type of control information. Furthermore, the length field in the sub-header is removed for control elements with a fixed length.

Both the MAC header and the MAC SDUs are of variable sizes.

A MAC PDU header consists of one or more MAC PDU subheaders; each subheader corresponds to either a MAC SDU, a MAC control element or padding.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

MAC PDU subheaders have the same order as the corresponding MAC SDUs, MAC control elements and padding. MAC control elements are always placed before any MAC SDU.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed at the beginning of the MAC PDU before any other MAC PDU subheader. A maximum of one MAC PDU can be transmitted per TB per UE. A maximum of one MCH MAC PDU can be transmitted per TTI.

The MAC header is of variable size and consists of the following fields:

1) LCID: The Logical Channel ID field identifies the logical channel instance of the corresponding MAC SDU or the type of the corresponding MAC control element or padding as described in Tables 1, 2 and 3 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. A UE of Category 0 shall indicate CCCH using LCID "01011", otherwise the UE shall indicate CCCH using LCID "00000". The LCID field size is 5 bits.

TABLE 1

Values of LCID for DL-SCH

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

TABLE 2

Values of LCID for UL-SCH

| Index | LCID values |
| --- | --- |
| 00000 | CCCH |
| 00001-01010 | Identity of the logical channel |
| 01011 | CCCH |
| 01100-10101 | Reserved |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TABLE 3

Values of LCID for MCH

| Index | LCID values |
| --- | --- |
| 00000 | MCCH (see note) |
| 00001-11100 | MTCH |
| 11101 | Reserved |
| 11110 | MCH Scheduling Information or Extended MCH Scheduling Information |
| 11111 | Padding |

NOTE:
If there is no MCCH on MCH, an MTCH could use this value.

2) L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

3) F: The Format field indicates the size of the Length field as indicated in Table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

TABLE 4

Values of F field

| Index | Size of Length field (in bits) |
| --- | --- |
| 0 | 7 |
| 1 | 15 |

4) E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte.

5) R: Reserved bit, set to "0".

Figure 9A:
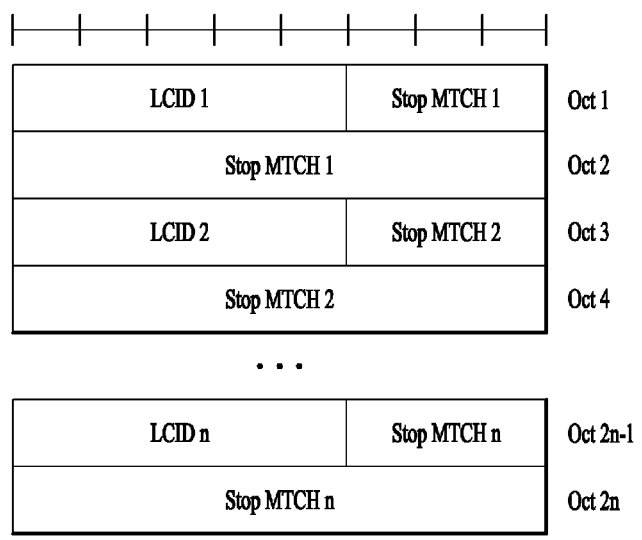
FIG. 9A is MCH Scheduling Information MAC control element.

FIG. 9A is a conceptual diagram illustrating for a MCH Scheduling Information MAC control element. The MCH Scheduling Information MAC Control Element illustrated in FIG. 9A is identified by a MAC PDU subheader with LCID as specified in Table 3. This control element has a variable size. For each MTCH the fields below are included LCID field, and Stop MTCH field. The LCID field indicates the Logical Channel ID of the MTCH. The length of the field is 5 bits, and the Stop MTCH field indicates the ordinal number of the subframe within the MCH scheduling period, counting only the subframes allocated to the MCH, where the corresponding MTCH stops. Value 0 corresponds to the first subframe. The length of the field is 11 bits. The special Stop MTCH value 2047 indicates that the corresponding MTCH is not scheduled. The value range 2043 to 2046 is reserved.

FIG. 9B is a conceptual diagram illustrating for an Extended MCH Scheduling Information MAC control element. The Extended MCH Scheduling Information MAC control element illustrated in FIG. 9B is identified by a MAC PDU subheader with LCID as specified in Table 3. This control element has a variable size. For each MTCH the fields below are included LCID field, and stop MTCH field.

The LCID field indicates the Logical Channel ID of the MTCH. The length of the field is 5 bits, and the Stop MTCH field indicates the ordinal number of the subframe within the MCH scheduling period, counting only the subframes allocated to the MCH, where the corresponding MTCH stops. Value 0 corresponds to the first subframe. The length of the field is 11 bits. The special Stop MTCH value 2047 indicates that the corresponding MTCH is not scheduled. The value range 2043 to 2046 is reserved.

For each MTCH, the fields below may be included LCID field, and S field. The LCID field indicates the Logical Channel ID of the MTCH. The length of the field is 5 bits. LCIDs x . . . x+y shall be equal to or a subset of the LCIDs 1 . . . n, and S field indicates that the transmission of the corresponding MTCH is to be suspended. The S field is set to 000. All other values are reserved.

In view of handling of unknown, unforeseen and erroneous protocol data, when a MAC entity receives a MAC PDU for the MAC entity's C-RNTI or Semi-Persistent Scheduling C-RNTI, or by the configured downlink assignment, containing reserved or invalid values, the MAC entity may discard the received PDU.

When a MAC entity receives a MAC PDU on MCH containing reserved values, the MAC entity may ignore the fields in the PDU header and the control elements containing reserved values and the corresponding parts indicated by the fields in the received PDU.

One MBMS service is carried by one MTCH, which is identified by the LCID. One MCH can carry multiple MBMS services, which means that multiple MTCHs are transmitted on MCH. However, the UE may not join all the MBMS service transmitted on the MCH, and thus the UE may not know all the LCIDs transmitted on the MCH.

In the prior art, handling of unknown LCID values on MCH is not specified. Only the handling of reserved values on MCH is specified, as mentioned above.

As the number of MBMS services is increased, the handling of unknown LCID values is required.

Figure 10:
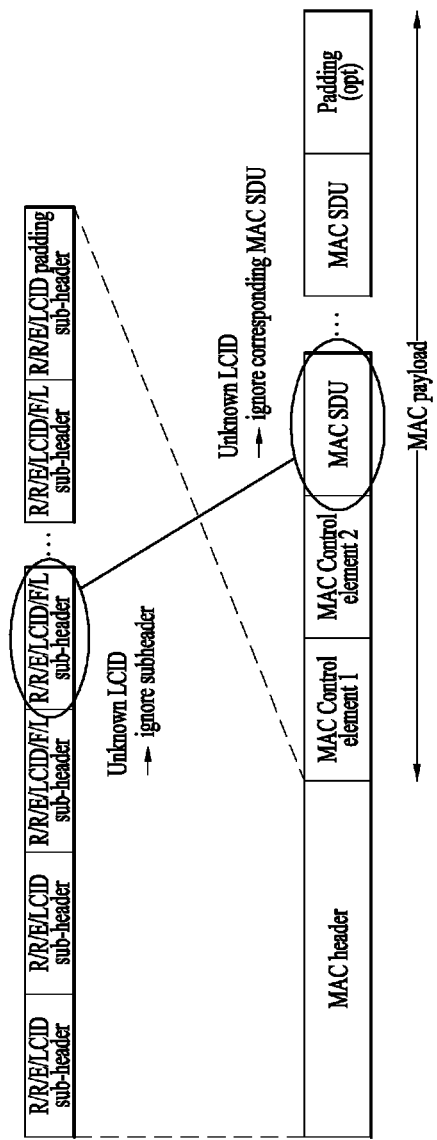
FIGS. 10 and 11 are conceptual diagrams for handling of unknown LCID values in a Multicast Channel in a wireless communication system according to embodiments of the present invention.
Figure 11:
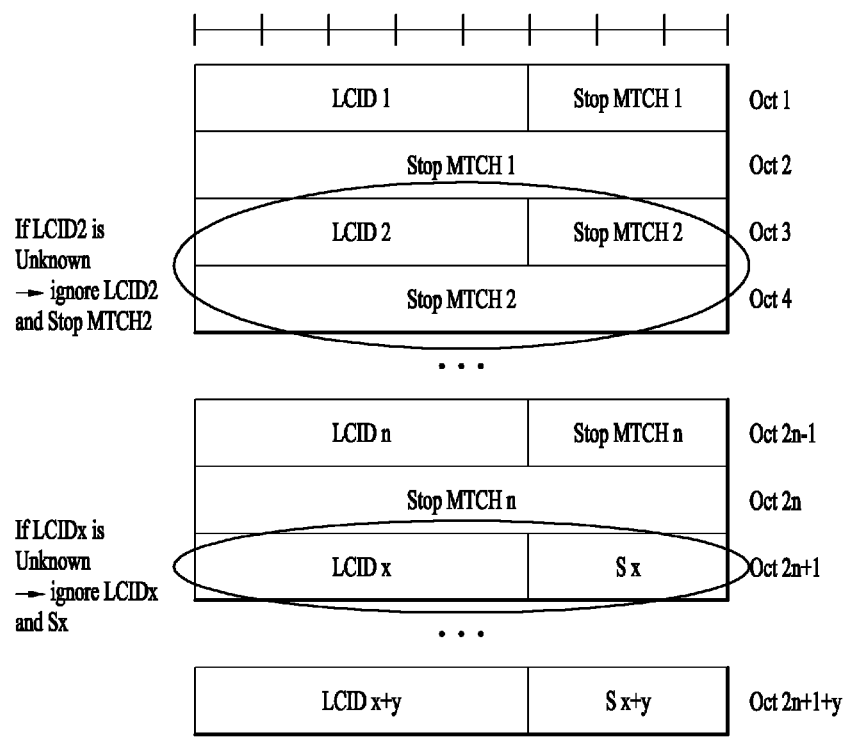

FIGS. 10 and 11 are conceptual diagrams for handling of unknown LCID values in a Multicast Channel in a wireless communication system according to embodiments of the present invention.

One MCH carries multiple MTCHs, and a UE may not join all of MTCHs transmitted on the MCH. It means that the UE may receive MAC PDUs containing unknown LCID values. In this case, the UE should ignore the parts related to the unknown LCIDs, and process all other parts not related to the unknown LCIDs. Therefore, similar handling of unknown values is required.

It is invented that when a UE receives a MAC PDU on MCH, and if the MAC PDU contains unknown LCID values, the UE may ignore the MAC PDU subheader containing unknown LCID values and the corresponding MAC SDUs or ignore the fields containing unknown LCID values and the corresponding fields associated with the unknown LCID values in the MAC control elements.

FIG. 10 is a diagram for a MAC PDU contains an unknown LCID value in R/R/E/LCID/F/L MAC PDU subheader.

The LCID identifies MCCH, MTCH, MAC control element, or padding transmitted on the MCH.

The unknown LCID value means: i) the UE has not joined an MBMS service transmitted on the MTCH identified by the LCID, or ii) the LCID is not configured to the UE. The unknown LCID values only occur among LCID values for MTCH, i.e. the unknown LCID value ranges from 00000 (if there is MCCH on MCH) or 00001 (if there is no MCCH on MCH) to 11100.

The unknown LCID values can be included in the MAC PDU subheader (R/R/E/LCID/F/L) or MAC CE (MSI MAC CE or Extended MSI MAC CE).

If an unknown LCID value is included in an MAC PDU subheader, the UE may discard or ignore the MAC PDU subheader including the unknown LCID value and the corresponding MAC SDU indicated by the R/R/E/LCID/F/L and process all other MAC PDU subheaders and corresponding MAC SDUs.

The FIG. 10 shows the case when one of R/R/E/LCID/F/L subheader contains unknown LCID value. The UE processes the MAC PDU except the R/R/E/LCID/F/L subheader and corresponding MAC SDU related to unknown LCID.

For example, the UE receives a MAC PDU including two LCIDs (a 1st LCID and a 2nd LCID) on a MCH. The UE does not join an MBMS service transmitted on an MTCH identified by the first LCID and the second LCID currently.

In this case, the UE discards a header field containing the 1st LCID and a corresponding MAC SDU indicated by the header field in the received MAC PDU, and processes remaining parts of the MAC PDU after the header field and the corresponding MAC SDU are discarded from the MAC PDU. When the UE processes the remaining parts of the MAC PDU, the UE discards also a header field containing the 2nd LCID and a corresponding MAC SDU indicated by the header field in the received MAC PDU, because the UE does not join an MBMS service transmitted on an MTCH identified by the second LCID currently. And then if there is no unknown LCID in the remaining parts anymore, the UE the MAC PDU except the R/R/E/LCID/F/L subheader and corresponding MAC SDU related to unknown LCID.

The UE does not monitor MCH during the period when the MTCH of unknown LCID is transmitted. The time period a certain MTCH is transmitted on the MCH is indicated by MSI MAC CE or E-MSI MAC CE.

FIG. 11 is a diagram for a MAC PDU contains an unknown LCID value in E-MSI MAC CE.

The LCID identifies MCCH, MTCH, MAC control element, or padding transmitted on the MCH.

The unknown LCID value means: i) the UE has not joined the MBMS service transmitted on the MTCH identified by the LCID, or ii) the LCID is not configured to the UE.

The unknown LCID values only occur among LCID values for MTCH, i.e. the unknown LCID value ranges from 00000 (if there is MCCH on MCH) or 00001 (if there is no MCCH on MCH) to 11100.

The unknown LCID values can be included in the MAC PDU subheader (R/R/E/LCID/F/L) or MAC CE (MSI MAC CE or Extended MSI MAC CE).

If the unknown LCID value is included in an MCH Scheduling Information MAC Control Element (MSI MAC CE) or an Extended MCH Scheduling Information MAC Control Element (E-MSI MAC CE), the UE may discard or ignore the fields containing unknown LCID values and the corresponding fields associated with the unknown LCID values, and process all other fields in the MAC CE.

FIG. 11 shows the case when one of LCID value included in the E-MSI MAC CE is unknown value. The UE processes the E-MSI MAC CE except the LCID/Stop MTCH or LCID/S related to unknown LCID.

The UE does not monitor MCH during the period when the MTCH of unknown LCID is transmitted. The time period a certain MTCH is transmitted on the MCH is indicated by MSI MAC CE or E-MSI MAC CE.

In conclusion, When a MAC entity receives a MAC PDU on MCH containing reserved or unknown LCID values, the MAC entity may ignore the MAC PDU subheaders containing reserved or unknown LCID values and the corresponding MAC SDUs, and in the MAC control elements, ignore the fields containing reserved or unknown LCID values and the fields associated with the fields containing reserved or unknown LCID values.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
receiving a Medium Access Control (MAC) Protocol Data Unit (PDU) including a first Logical Channel Identifier (LCID) and a MAC Service Data Unit (SDU) related to the first LCID on a Multicast Channel (MCH);
determining that the first LCID is not one of a plurality of reserved values on the MCH;
checking whether the UE has joined a Multimedia Broadcast Multicast Service (MBMS) service transmitted on a Multicast Traffic Channel (MTCH) identified by the first LCID;
discarding a sub-header field including the first LCID and the MAC SDU related to the first LCID in the received MAC PDU, when the first LCID identifies an MTCH, on which an MBMS service that the UE did not join, is transmitted; and
processing parts of the MAC PDU, other than the sub-header field and the MAC SDU discarded from the MAC PDU.

2. The method according to claim 1, wherein a value of the first LCID is one of a plurality of LCID values allocated for a Multicast Traffic Channel (MTCH).

3. The method according to claim 1, wherein a value of the first LCID is one of 00001 to 11100.

4. A method for a User Equipment (UE) operating in a wireless communication system, the method comprising:
receiving a Medium Access Control (MAC) Control Element (CE) including a first Logical Channel Identifier (LCID) on a Multicast Channel (MCH);
determining that the first LCID is not one of a plurality of reserved values on the MCH;
checking whether the UE has joined a Multimedia Broadcast Multicast Service (MBMS) service transmitted on a Multicast Traffic Channel (MTCH) identified by the first LCID;
discarding at least one field related to the first LCID in the MAC CE, when the first LCID identifies an MTCH, on which an MBMS service that the UE did not join, is transmitted; and
processing remaining parts of the MAC CE, other than the at least one field related to the LCID discarded from the MAC CE.

5. The method according to claim 4, wherein the at least one field related with the first LCID includes an LCID field related to the first LCID, a stop MTCH field related to the first LCID, and a suspended field related to the first LCID.

6. The method according to claim 4, wherein a value of the first LCID is one of a plurality of LCID values allocated for Multicast Traffic Channel (MTCH).

7. The method according to claim 4, wherein a value of the first LCID is one of 00001 to 11100.

8. The method according to claim 4, wherein the UE doesn't monitor the MCH during a time period when the MBMS service, that the UE doesn't join, is transmitted on the MTCH identified by the first LCID.

9. The method according to claim 8, wherein the time period is informed by an MCH Scheduling Information (MSI) MAC CE or an Extended MCH Scheduling Information (E-MSI) MAC CE.

10. A User Equipment (UE) operating in a wireless communication system, the UE comprising:
a receiver and a transmitter; and
a processor, operably coupled to the receiver and the transmitter, wherein the processor is configured to:
receive a Medium Access Control (MAC) Protocol Data Unit (PDU) including a first Logical Channel Identifier (LCID) and a MAC Service Data Unit (SDU) related to the first LCID on a Multicast Channel (MCH),
determine that the first LCID is not one of a plurality of reserved values on the MCH,
check whether the UE has joined a Multimedia Broadcast Multicast Service (MBMS) service transmitted on a Multicast Traffic Channel (MTCH) identified by the first LCID,
discard a sub-header field including the first LCID and a MAC SDU related to the first LCID in the received MAC PDU, when the first LCID identifies an MTCH, on which an MBMS service that the UE did not join, is transmitted; and
process parts of the MAC PDU, other than the sub-header field and the MAC SDU discarded from the MAC PDU.

11. The UE according to claim 10, wherein a value of the first LCID is one of a plurality of LCID values allocated for a Multicast Traffic Channel (MTCH).

12. The UE according to claim 10, wherein a value of the first LCID is one of 00001 to 11100.

* * * * *